(12) United States Patent
    Sinkov et al.

(10) Patent No.: US 11,412,325 B2
(45) Date of Patent: Aug. 9, 2022

(54) RECORDING MEETING AUDIO VIA MULTIPLE INDIVIDUAL SMARTPHONES

(71) Applicant: Evernote Corporation, Redwood City, CA (US)

(72) Inventors: Andrew Sinkov, San Francisco, CA (US); Alexander Pashintsev, Cupertino, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 32 days.

(21) Appl. No.: 16/904,434

(22) Filed: Jun. 17, 2020

(65) Prior Publication Data

US 2020/0322723 A1  Oct. 8, 2020

Related U.S. Application Data

(60) Division of application No. 16/231,056, filed on Dec. 21, 2018, now Pat. No. 10,701,482, which is a
(Continued)

(51) Int. Cl.
| | |
|---|---|
| *G10L 15/00* | (2013.01) |
| *H04R 3/00* | (2006.01) |
| *G06F 40/169* | (2020.01) |
| *G10L 15/26* | (2006.01) |
| *H04R 3/04* | (2006.01) |
| *G10L 25/51* | (2013.01) |
| *G10L 17/00* | (2013.01) |
| *G10L 21/0208* | (2013.01) |
| *G10L 21/028* | (2013.01) |

(52) U.S. Cl.
CPC ............ *H04R 3/005* (2013.01); *G06F 40/169* (2020.01); *G10L 15/26* (2013.01); *G10L 17/00* (2013.01); *G10L 21/028* (2013.01); *G10L 25/51* (2013.01); *G10L 2021/02087* (2013.01); *H04R 3/04* (2013.01); *H04R 2430/01* (2013.01); *H04R 2499/11* (2013.01)

(58) Field of Classification Search
CPC ......... G10L 17/00; G10L 17/02; G10L 17/26; G10L 15/00; G10L 15/04; G10L 15/20; G10L 15/26
USPC ......... 704/201, 225, 246, 248, 235, 231, 278
See application file for complete search history.

(56) References Cited

U.S. PATENT DOCUMENTS

| | | | | |
|---|---|---|---|---|
| 5,668,863 | A * | 9/1997 | Bieselin | H04M 3/56 379/202.01 |
| 2013/0204618 | A1 * | 8/2013 | Henry | H04M 3/568 704/235 |
| 2015/0381939 | A1 * | 12/2015 | Cunico | G06K 9/00315 348/14.07 |

* cited by examiner

*Primary Examiner* — Qi Han
(74) *Attorney, Agent, or Firm* — Morgan, Lewis & Bockius LLP

(57) ABSTRACT

A method of providing audio information from a meeting includes receiving a first audio stream from a first input audio device and a second audio stream from a second input audio device during the meeting, identifying a first audio fragment from the first audio stream, and identifying a second audio fragment from the second audio stream. The method also includes compiling the audio fragments from the first and second audio streams into an audio file that includes at least the first audio fragment and the second audio fragment. The method further includes providing the audio file to one or more recipients. The audio file identifies the first audio fragment as corresponding to a first participant of the meeting and the second audio fragment as corresponding to a second participant of the meeting.

20 Claims, 4 Drawing Sheets

Related U.S. Application Data continuation of application No. 15/214,559, filed on Jul. 20, 2016, now Pat. No. 10,171,908.

(60) Provisional application No. 62/197,249, filed on Jul. 27, 2015.

RECORDING MEETING AUDIO VIA MULTIPLE INDIVIDUAL SMARTPHONES

RELATED APPLICATIONS

This application is a continuation of U.S. application Ser. No. 16/231,056, filed on Dec. 21, 2018, entitled, "RECORDING MEETING AUDIO VIA MULTIPLE INDIVIDUAL SMARTPHONES," which is a continuation of U.S. application Ser. No. 15/214,559, filed on Jul. 20, 2016, entitled, "RECORDING MEETING AUDIO VIA MULTIPLE INDIVIDUAL SMARTPHONES," now U.S. Pat. No. 10,171,908, issued on Jan. 1, 2019, which claims priority to U.S. Prov. App. No. 62/197,249, filed on Jul. 27, 2015, entitled "RECORDING MEETING AUDIO VIA MULTIPLE INDIVIDUAL SMARTPHONES", all of which are incorporated herein by reference.

TECHNICAL FIELD

This application is directed to the field of recording and processing audio, and more particularly to the field of recording and organizing audio streams recorded on multiple smartphones of meeting participants.

BACKGROUND OF THE INVENTION

Inefficiency of business meetings poses a major challenge for enterprise and personal productivity. According to expert estimates, millions of corporate and organizational meetings occur in the United States daily. On average, employees spend 20-40% of their time in the meetings, while upper managers dedicate up to 80-90% of their time resources to meetings.

Multiple surveys agree in their findings that only a relatively small percent of the meetings (45-50%, by some estimates) are considered efficient by the majority of their participants. Accordingly, there is a shared belief among time management professionals that nearly 50% of employee time in the meetings is wasted. This is confirmed by many polls: thus, 47% of 3,200 employees participating in a 2012 work efficiency survey identified corporate meetings as the single leading time-wasting factor. It is estimated that inefficiency of corporate meetings causes multi-billion dollar business losses every year.

Experts in various areas of business efficiency are dissecting problems facing meeting productivity in many different ways. Overall, a significant number of researchers agree that two factors related to enterprise information management rank top on the list of issues causing extensive waste of time at and between meetings: the first factor is insufficient preparedness by meeting organizers, participants and leaders and the second factor is poor compilation and distribution of meeting materials. According to one survey on meeting efficiency, for two thirds of repetitive business meetings, no relevant materials are distributed to meeting participants, who are left guessing about the meeting specifics and remain confused about decisions made at the meetings. The same survey has discovered that around 63% of repetitive meetings do not always have meeting minutes produced, while almost 40% of the existing meeting minutes take over a week to get delivered to the target audience. Subsequently, meeting results and follow-up actions also remain unknown to many participants and other involved personnel. These shortcomings in organization and follow-up of business meetings call for a significant improvement in creating and distributing adequate meeting materials.

Smartphones have long become pervasive mobile devices and are playing an increasing role in scheduling and tracking business meetings. It can be safely assumed that for the vast majority of modern corporate and organizational meetings, nearly 100% of their participants own one or another model of a smartphone and bring their mobile device (or multiple devices) to every meeting. Smartphones and other mobile devices such as phablets or larger tablet devices are used by meeting participants on a regular basis to receive scheduling information, access meeting agenda, capture various visual aspects of meetings via smartphone cameras, such as whiteboard content, take typed and handwritten notes, etc. Some participants also record meeting audio on their smartphones.

Notwithstanding significant progress in capturing meeting materials, an important component of in-person and remote meetings, an adequate audio recording, remains underdeveloped. Only a small number of conference facilities are equipped with high-end audio conferencing and recording equipment, including distributed microphones. But even with such equipment, meeting speech segmentation and speaker diarization (determining who spoke when) represent difficult tasks and complicate processing audio recordings of meetings by their recipients. Accordingly, post-processing of recorded audio materials, adding voice and other annotations, handling simultaneous talk by several participants and voice-to-text transcription of meeting results, compiling a consistent storyline for distribution to participants and others may become a difficult and time consuming task and may further contribute to delays in meeting follow-up.

Accordingly, it is desirable to provide high quality audio recording of meeting without expensive equipment, allowing speaker identification, easy annotation and voice-to-text conversion.

SUMMARY OF THE INVENTION

According to the system described herein, recording audio information from a meeting includes determining which of a plurality of specific personal audio input audio devices correspond to which specific meeting participants, measuring volume levels at each of the personal audio input devices in response to each of the meeting participants speaking, identifying that a first particular one of the participants is speaking based on stored voice profiles and/or relative volume levels at each of the personal audio input devices, recording on a first channel audio input at a first one of the personal audio input audio devices corresponding to the first particular speaker, identifying that a second particular one of the participants is speaking based on stored voice profiles and/or relative volume levels at each of the personal audio input devices, recording on a second channel audio input at a second one of the personal audio input audio devices corresponding to the second particular speaker, the first and second channels being separate from each other, and merging the first and second channels to provide a storyboard that includes audio input from the channels and identification of speakers based on which specific ones of the channels contains the audio input. Determining which of the plurality of specific personal audio input audio devices correspond to which of the meeting participants may be based on which of the meeting participants owns which of the specific personal audio input audio devices. At least some of the specific personal audio input audio devices may be smartphones. Recording audio information from a meeting may also include linking the plurality of specific personal audio input audio devices prior to the meeting and equalizing sound detection levels in the personal audio input audio devices. Recording audio information from a meeting may also include simultaneously recording audio input at the first one of the personal audio input audio devices and on the first channel and audio input at the second one of the personal audio input audio devices and on the second channel in response to the first and second meeting participants speaking at the same time. Recording audio information from a meeting may also include filtering the audio input at the first channel and the second channel to separate speech by the first participant from speech by the second participant. Filtering the audio input may be based on a distance related volume weakening coefficient, signal latency between the personal audio input devices, and/or ambient noise. Recording audio information from a meeting may also include providing additional voice annotations on the storyboard. The additional annotations may be provided following the meeting. The additional annotations may be provided by one of the participants. The additional annotations may be related to specific speech fragments and/or commentary for an entire meeting. Recording audio information from a meeting may also include providing pre-recorded introductions on the storyboard for at least some of the meeting participants. Visual identification may be provided on a particular one of the personal audio input audio devices identified as corresponding to a current speaker. A meeting participant may confirm on the particular one of the personal audio input audio devices whether a corresponding one of the meeting participants is the current speaker. At least a portion of the storyboard may be transcribed using voice-to-text transcription. At least some of the meeting participants may be in remote offices.

According further to the system described herein, a non-transitory computer-readable medium contains software that records audio information from a meeting. The software includes executable code that determines which of a plurality of specific personal audio input audio devices correspond to which specific meeting participants, executable code that measures volume levels at each of the personal audio input devices in response to each of the meeting participants speaking, executable code that identifies that a first particular one of the participants is speaking based on at least one of: stored voice profiles and relative volume levels at each of the personal audio input devices, executable code that records on a first channel audio input at a first one of the personal audio input audio devices corresponding to the first particular speaker, executable code that identifies that a second particular one of the participants is speaking based on stored voice profiles and/or relative volume levels at each of the personal audio input devices, executable code that records on a second channel audio input at a second one of the personal audio input audio devices corresponding to the second particular speaker, the first and second channels being separate from each other, and executable code that merges the first and second channels to provide a storyboard that includes audio input from the channels and identification of speakers based on which specific ones of the channels contains the audio input. Determining which of the plurality of specific personal audio input audio devices correspond to which of the meeting participants may be based on which of the meeting participants owns which of the specific personal audio input audio devices. At least some of the specific personal audio input audio devices may be smartphones. The software may also include executable code that links the plurality of specific personal audio input audio devices prior to the meeting and equalizes sound detection levels in the personal audio input audio devices. The software may also include executable code that simultaneously records audio input at the first one of the personal audio input audio devices and on the first channel and audio input at the second one of the personal audio input audio devices and on the second channel in response to the first and second meeting participants speaking at the same time. The software may also include executable code that filters the audio input at the first channel and the second channel to separate speech by the first participant from speech by the second participant. Filtering the audio input may be based on a distance related volume weakening coefficient, signal latency between the personal audio input devices, and/or ambient noise. The software may also include executable code that facilitates providing additional voice annotations on the storyboard. The additional annotations may be provided following the meeting. The additional annotations may be provided by one of the participants. The additional annotations may be related to specific speech fragments and/or commentary for an entire meeting. The software may also include executable code that facilitates providing pre-recorded introductions on the storyboard for at least some of the meeting participants. Visual identification may be provided on a particular one of the personal audio input audio devices identified as corresponding to a current speaker. A meeting participant may confirm on the particular one of the personal audio input audio devices whether a corresponding one of the meeting participants is the current speaker. At least a portion of the storyboard may be transcribed using voice-to-text transcription. At least some of the meeting participants may be in remote offices.

The proposed system records meeting audio on individual smartphones of meeting participants while providing automatic diarization and speaker identification for every speaker change; a master recording of each fragment is provided by a principal smartphone belonging to the speaker (or to each of the speakers in case of double-talk). Subsequently, a final arrangement of fragments into a storyline is compiled from recordings by principal smartphones. The system partially or completely clears double-talk episodes from fragments of recording using cross-recording by principal smartphones. The system also provides enhanced voice annotation and voice-to-text conversion capabilities, taking advantage of speaker identification, and may compile voice annotations into the storyline.

System functioning includes the following:

1. At a start of a meeting, the system establishes connections between smartphones of participants; connection types may depend on the system implementation and configuration and may include peer-to-peer connections, as well as various types of client-server connections that may use local or cloud server(s).

2. The system may change audio settings on phones of meeting participants to level (equalize) recording characteristics of different phones. Initially, the system may do this at the start of the meeting and may continue fine-tuning phones as the meeting progresses and as acoustic parameters of the meeting room are revealed and possibly change.

3. All smartphones of meeting participants may be permanently placed into recording modes. A natural pre-condition of system functioning is that each participant is using the smartphone belonging to that participant as a personal device. Accordingly, a particular smartphone of a meeting participant is residing significantly closer an owner of the particular smartphone than smartphones of other participants. Therefore, sound volume received by the smartphone of the speaking person is significantly higher than the sound volume received by smartphones of other participants (with possible normalization for the maximum recording volumes accepted by different devices and after calibration of each phone to normal talking volume of its owner).

4. The difference in reception volumes by various phones of participants, averaged over short periods of time, may be propagated to the system and may drive diarization of the current fragment of the audio recording, i.e. speaker identification. In an embodiment, a pairwise connection graph between smartphones of participants may be used as a speaker identification model. For example, if a node of the connection graph may be detected such that min $(\Delta \nabla) > 0$ for each edge incidental with the node, where $\Delta \nabla$ is a difference of an averaged reception volume between the smartphone in the detected node and the other node incidental to the edge, then the participant and the smartphone corresponding to the detected node may serve as candidates. respectively, for the current speaker and a principal recording phone, as explained elsewhere herein.

5. Once the current speaker is identified, a particular smartphone of the speaker is marked by the system as a principal recording device and the system tracks a corresponding fragment of audio recording by that particular smartphone until a sufficiently long pause when the speaker either stopped talking to change the subject or for other reason or until the current speaker is replaced by another speaker. In either case, the fragment is picked by the system and added to the current channel of the speaker. Each channel of each speaker may therefore include subsequent fragments by a single speaker, uninterrupted by others and separated by pauses (such fragments may of course may be merged during post-processing of the meeting recording) or fragments separated in time by audio fragments from other speakers recorded in their channels. In addition to volume characteristics, latency of signal reception and explicit voice ID or audio profile of each speaker, generated by voice identification or voice recognition systems and stored in the system or on individual smartphones, may be used to further verify speaker identity and improve diarization. Note that other smartphones may remain in permanent recording modes at all times and therefore record the audio stream of each speaker, albeit with lower volume and clarity. However, recording fragments of other speakers by other smartphones may be discarded by the system and may not be added to any of the speaker channels.

6. In the event of double-talk when two or more speakers talk simultaneously for a period of time, the system may initially identify each speaker, as explained above, and record double-talk on all principal smartphones owned by current speakers. After a double talk episode has ended, the system may attempt clearing each recorded fragment from double-talk by non-owners prior to placing it into the corresponding speaker channel. Such clearing may be facilitated by simultaneous processing of recorded fragments from all principal phones engaged in the double-talk.

For example, in case of two simultaneous speakers John (J) and Helen (H), the two signals recorded by principal phones may be schematically presented as:

$$J_2(t) + \alpha H_1(t-\beta) + A_1 \quad \text{(John's channel)}$$

$$H_1(t) + \alpha J_2(t-\beta) + A_2 \quad \text{(Helen's channel)}$$

where $J_2(t)$ and $H_1(t)$ are a second speaking fragment in John's channel and a first speaking fragment in Helen's channel; $\alpha$ is a distance related volume weakening coefficient; $\beta$ is signal latency between the two phones; and $A_1, A_2$ are ambient noises recorded by the first and the second speaker's smartphones.

The availability of two symmetric cross-recordings may facilitate assessing the coefficients (after an initial cancellation of ambient noises $A_1, A_2$) and filtering out the weaker components using, for example, echo cancellation technique. Even if the double-talk suppression process has not fully succeeded, each channel unambiguously represents a corresponding speaker and any mix of speaker voices may be instantly identified in a full record by referring to the simultaneous recording by other principal phone(s), i.e. by switching channels of simultaneous speakers.

7. In the first minutes of a new meeting, the system may function in learning mode, adapting to configuration of smartphones of meeting participants and to a specific acoustic environment of a meeting place. Accordingly, the system may provide and request feedback from meeting participants. For instance, a visual signal (blinking, color change, other display effects) may appear on a screen of a primary recording device. If the device has been chosen incorrectly, the participant may respond to the system—for example, by tapping on a touchscreen, to indicate an error, without interrupting the meeting, and the system may continue searching for the right primary device, narrowing the possible choices. This may lead to swapping recorded fragments between channels due to change of identified speaker and may affect recording quality through a learning period.

8. Recipients of an audio recording of the meeting may replay the recording in a variety of ways and may compile one or multiple storyboards from all or certain subsets of speaker channels and fragments, emphasizing or de-emphasizing certain speakers and/or fragments and potentially grouping speakers/fragments by topics.

9. Meeting participants and recipients of the recording may add voice annotations to particular speaker fragments or to the whole recording. The system may initially record such comments in separate channels opened for each commenter (after a commentator identifies himself) and may establish references between annotations and initial fragments. Subsequently, the system may automatically or semi-automatically, directed by commenters, compile storyline(s) that include speaking fragments of original participants, combined with annotations.

10. Additionally, where sound quality recorded by principal phones is sufficient, speech recognition technologies and software for voice-to-text conversion may be used for creating transcriptions. Voice-to-text applications may additionally benefit from explicit voice profiles of identified speakers recorded on devices of the speakers or made available otherwise.

The system may offer a range of tools, applications and services for manipulating, cross-referencing, enhancing, annotating, compiling storylines, voice-to-text conversion and distribution of meeting recordings in their original and/or modified forms and contribute to adequate and timely distribution of meeting content. The system may be combined with other media, such as photographs of whiteboards with meeting brainstorms, accompanying documents, email correspondence, etc.

In addition to a single meeting room configuration, the system may be used for remote meetings in several locations. In this case, additional audio sources, such as speakers to listen to remote participants, may be present in some or all remotely connected meeting rooms and some of the remote participants may be identified only within a physical meeting room containing remote participants, while remaining unidentified in other meeting rooms until the end of the meeting; the remote participants may be subsequently identified on the meeting storyline, which may also include indications of meeting rooms with each speaking fragment.

The system may also track meeting participants who do not have smartphones in close proximity, temporarily or for the duration of the meeting. For example, a new participant without a smartphone may join a meeting and may be detected by a closest phone but not necessarily identified personally as one of the participants with a Voice ID and/or known profile. Identification of the new participant may remain unknown or may be explicitly added at a storyline compilation time. Another similar situation occurs when a user leaves a smartphone at a desk and moves around a meeting room—for example, draws on a whiteboard or controls a projector. In this case, a participant speaking away from a personal smartphone may be tracked by a closest smartphone of another participant but may be identified not as the owner of the closest smartphone; to provide such identification, the system may poll voice IDs and profiles of all participants in the meeting room.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for recording meeting audio on multiple individual smartphones of meeting participants, automatic speaker identification, handling double-talk episodes, compiling meeting storyline from fragments recorded in speaker channels, including post-meeting voice annotations, and optional voice-to-text conversion of certain portions of recording.

Figure 1:
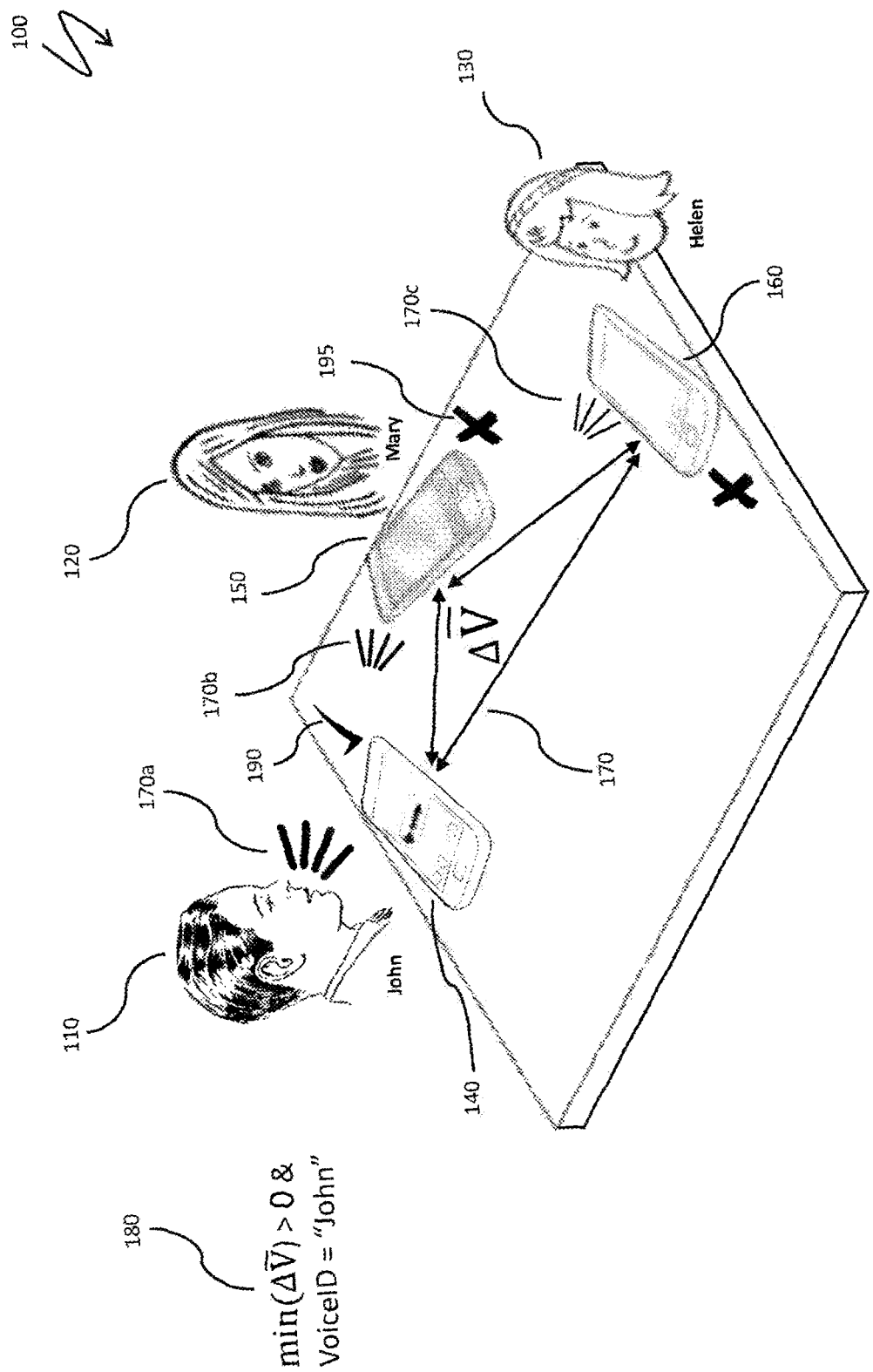
FIG. 1 is a schematic illustration of speaker identification, according to an embodiment of the system described herein.

FIG. 1 is a schematic illustration 100 of speaker identification. Meeting participants 110, 120, 130 come to a meeting with personal smartphones 140, 150, 160 (possibly running different mobile operating systems), all capable of audio recording and having software, explained elsewhere herein, installed. Note that, other personal audio input devices may be used in place of one or more of the smartphones 140, 150, 160, such as a tablet, a dedicated recording device, etc. A connection graph 170 is used to identify a current speaker. In FIG. 1, the participant 110 starts speaking and each of the smartphones 140, 150, 160 receives voice signals 170a, 170b, 170c of different volume, as schematically depicted by line thickness decreasing for the smartphones 150, 160 located further from the speaker 110. The system averages signal volumes received by each of the smartphones 140, 150, 160 over short periods of time and builds deltas of average volumes for each edge of the connection graph 170. If a condition min $(\Delta \overline{V}) > 0$ is satisfied, where the minimum is taken for all edges starting at the node 140, then the participant 110 who is an owner of the smartphone 140 is marked as a candidate for an active speaker. Additional conditions may be checked for verification; for example, unique voice characteristics may be extracted from the signal and compared with a stored value of Voice ID on the smartphone 140 of the participant 110, as illustrated by a criteria 180.

If all conditions and checks for a current speaker are satisfied, the participant 110 is marked as an active speaker and the smartphone 140 of the participant 110 is marked as a principal recording device and becomes a designated one of the smartphones 140, 150, 160 recording a voice stream of the participant 110, as schematically shown on the screen of the smartphone 140. A channel of the participant 110 is activated (or created if the participant 110 speaks for the first time in the meeting) and a fragment of an audio recording of the participant 110 is added to the channel after a pause or speaker change, as explained elsewhere herein.

Figure 2:
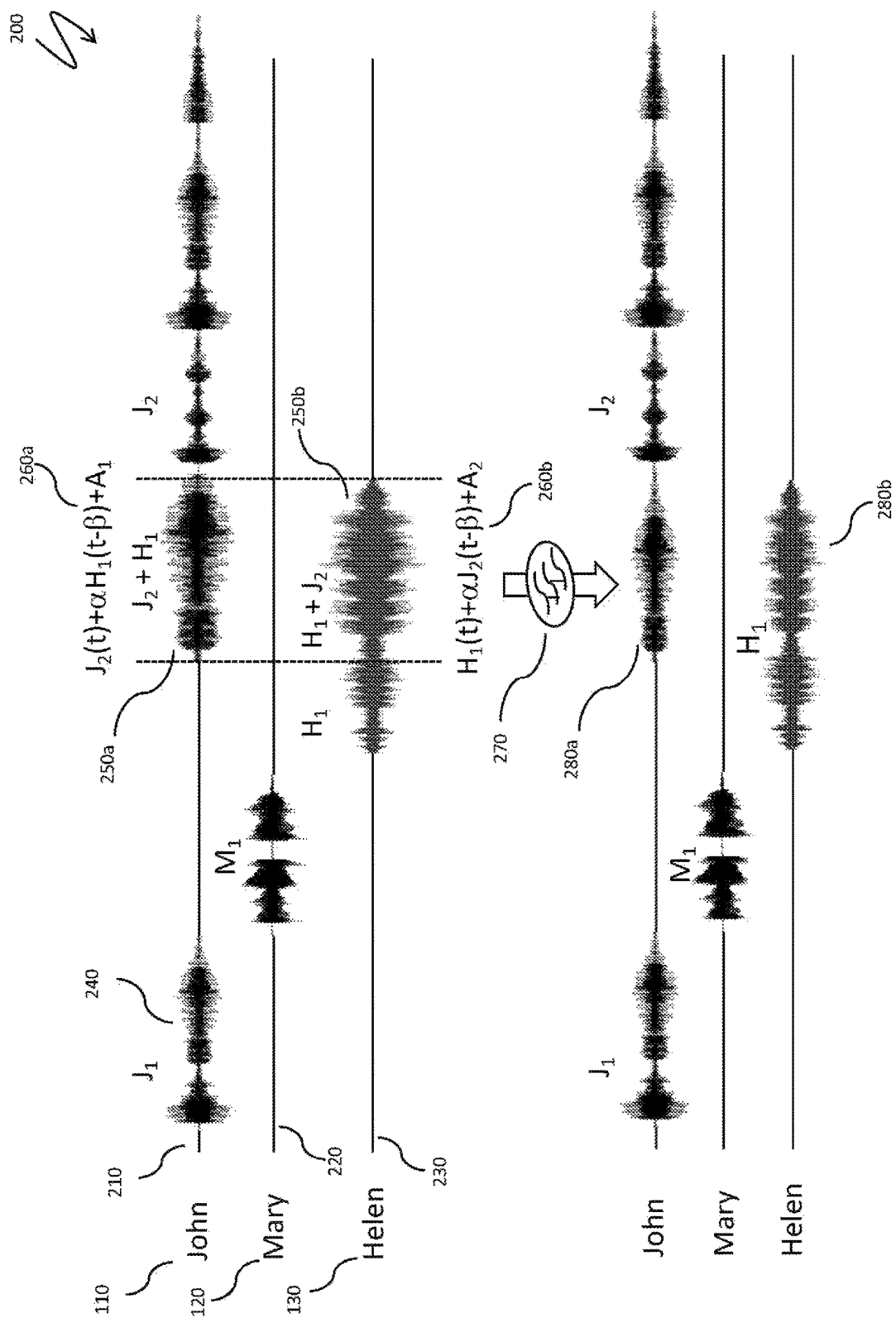
FIG. 2 is a schematic illustration of speaker channels and of handling double-talk episodes, according to an embodiment of the system described herein.

FIG. 2 is a schematic illustration 200 of storyline compilation, post-meeting annotation and voice-to-text features. Each of the meeting participants 110, 120, 130 has been an active speaker at some time during the meeting; accordingly, channels 210, 220, 230 corresponding to the participants 110, 120, 130 have been created by the system and kept as audio fragments 240 of active speakers. When a fragment of double-talk is identified, the fragment may be recorded on more than one principal device, as illustrated by double-talk fragments 250a, 250b. Even though audio signals recorded by the two principal devices represent the same conversation, the audio signals may not be identical, as explained elsewhere herein and illustrated by audio signal profile functions 260a, 260b. The system may attempt to resolve double talk fragment and retrieve individual fragments assignable to each active speaker channel by applying various filtering techniques 270, such as LMS filtering. If successful, separate fragments 280a, 280b may be added to their respective channels. Otherwise, double-talk recorded on each principal recording device may be added to the corresponding channel, all double-talk fragments may be cross-referenced and switchable between channels.

Figure 3:
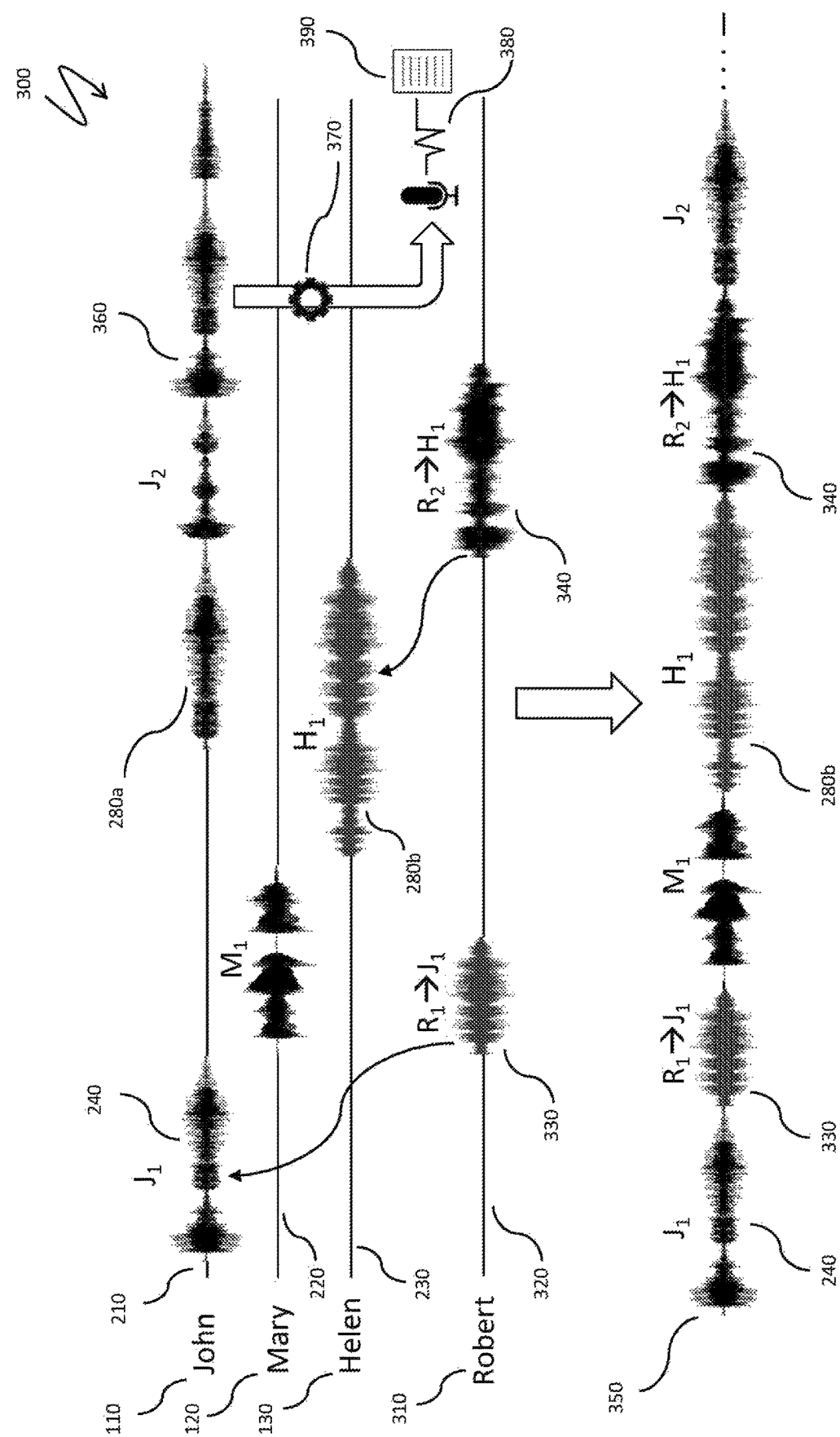
FIG. 3 schematically illustrates storyline compilation, post-meeting annotation and voice-to-text features, according to an embodiment of the system described herein.

FIG. 3 is a schematic illustration 300 of storyline compilation, post-meeting annotation and voice-to-text features. The three channels 210, 220, 230 of the original meeting participants 110, 120, 130 correspond to the fragments 240, 280a, 350, 280b of audio recording by each active speaker during the meeting. A commenter 310 listens to the recording of the meeting and decides to add voice comments to several fragments. A separate channel 320 is created for the commenter 310 and maintains a voice annotation 330 for a fragment 240 by the participant 110 and another voice annotation 340 for a fragment 280b by the speaker 130, retrieved from a double-talk, as explained elsewhere herein. Voice annotations may also refer to a particular topic or a meeting as a whole.

A storyline 350 of a meeting may be compiled from original audio fragments for meeting participants recorded during the meeting, combined with voice annotations and other components, such as pre-recorded introductions of each speaker and organized chronologically, by topics or otherwise. For example, the storyline 350 may be organized in a chronological order of speaker fragments, with the addition of voice annotations immediately after annotated fragments. Such storylines may be distributed as key meeting materials shortly after the end of the meeting.

Some of the recorded audio fragments may be converted to text using voice-to-text technologies. In FIG. 3, a fragment 360 by the participant 110 is automatically transcribed. To facilitate voice recognition, a voice profile 370 may be extracted from a device of the participant 110 (or may be stored in the system for the commentator 310) and used by a voice-to-text system 380 to create transcribed text 390.

Figure 4:
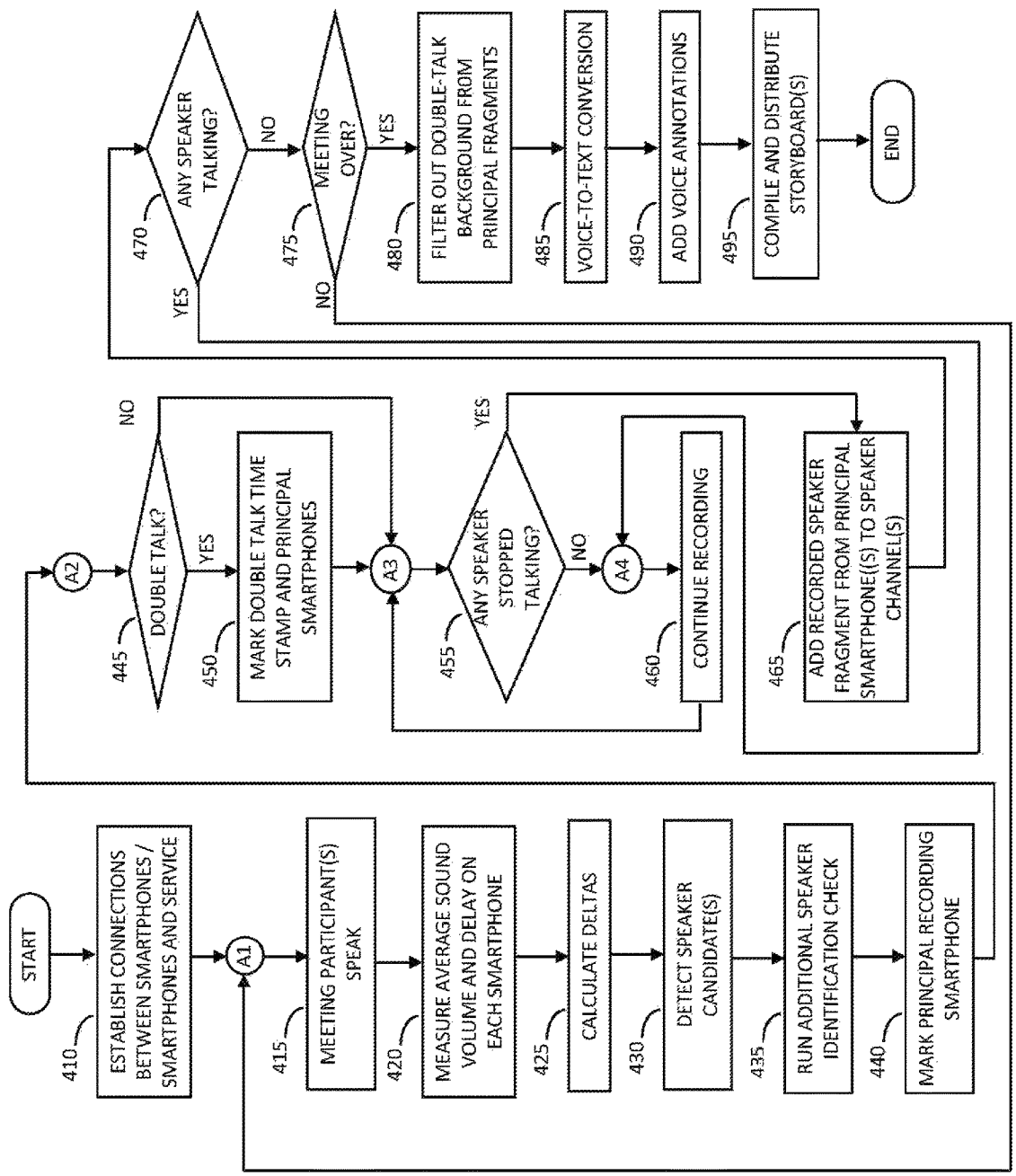
FIG. 4 is a system flow diagram illustrating system functioning, according to an embodiment of the system described herein.

Referring to FIG. 4, a system flow diagram 400 illustrates processing in connection with recording a meeting on multiple individual phones. Note that the processing for the system described herein may be provided by one or more of the smartphones 140, 150, 160, by a smartphone (or similar device) of a non-participant, a separate computing device (e.g., desktop computer), in connection with a cloud service (or similar) coupled to one or more of the smartphones 140, 150, 160, etc.

Processing begins at a step 410, where the system establishes connections between smartphones of participants and/or with a local or cloud service run by the system. The system may also ensure that software for the system is running on each smartphone of each participant and that a recording mode on each smartphone is enabled. After the step 410, processing proceeds to a step 415, where a meeting participant speaks. After the step 415, processing proceeds to a step 420, where the system measures average volume of an audio signal over short periods of time and delay of the audio signal on each smartphone, as explained elsewhere herein (see in particular FIG. 1 and the accompanying text). After the step 420, processing proceeds to a step 425, where the system calculates deltas of average volumes received by different smartphones of the participants over a connectivity graph, as explained in more details in conjunction with FIG. 1.

After the step 425, processing proceeds to a step 430, where a candidate for the current speaker is detected according to specific criteria, as explained elsewhere herein. After the step 430, processing proceeds to a step 435, where the system runs an additional speaker identification check, as explained in conjunction with FIG. 1 and speaker identification criteria 180 explained elsewhere herein. After the step 435, processing proceeds to a step 440 where the system designates and marks a principal recording smartphone (i.e., the only smartphone that records the audio fragment from the current speaker until conditions change, as explained elsewhere herein). After the step 440, processing proceeds to a test step 445, where it is determined whether double-talk is detected by the system. If so, processing proceeds to a step 450, where the system marks the starting time stamp of a double-talk fragment and designates principal smartphones for recording the fragment. After the step 450, processing proceeds to a test step 455, where it is determined whether any of the speakers stopped talking (note that the test step 455 can be independently reached from the test step 445 if double-talk has not been identified). If not, processing proceeds to a step 460 where the system and the principal recording smartphone(s) continue capturing the current fragment.

After the step 460, processing proceeds back to the test step 455. If it was determined at the test step 455 that any of the current speakers stopped talking, processing proceeds to a step 465, where a recorded speaker fragment from principal smartphones is added to the corresponding speaker channels, as explained elsewhere herein (see FIGS. 2, 3 and the accompanying text). After the step 465, processing proceeds to a test step 470, where it is determined whether any speaker is talking. If so, processing proceeds back to the step 460 for continued recording of a fragment; otherwise, processing proceeds to a test step 475, where it is determined whether the meeting is over. If not, processing proceeds back to the step 425 for continued speaker identification and recording of the meeting by audio fragments; otherwise, processing proceeds to a step 480 where the system attempts filtering out double-talk background from principal fragments or split double-talk into speaker channels, as explained elsewhere herein (see FIG. 2 and the accompanying text).

After the step 480, processing proceeds to a step 485, where certain fragments may be optionally transcribed to text, as explained elsewhere herein, in particular, in conjunction with FIG. 3. After the step 485, processing proceeds to a step 490, where voice annotations may optionally be added by meeting participants or other user of the system, as explained elsewhere herein. After the step 490, processing proceeds to a step 495, where audio storyboards of the meeting are compiled and distributed, as explained elsewhere herein. After the step 495, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions Smartphones functioning as audio recording devices may include software that is pre-loaded with the device, installed from an app store, installed from a desktop (after possibly being pre-loaded thereon), installed from media such as a CD, DVD, etc., and/or downloaded from a Web site. Such smartphones may use operating system(s) selected from the group consisting of iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of recording audio information from a meeting, the method comprising:
   establishing a first connection with a first audio input device of a plurality of audio input devices, the first connection configured to enable a system to receive a first audio stream recorded by the first audio input device;
   establishing a second connection with a second audio input device of the plurality of audio input devices, the second connection configured to enable the system to receive a second audio stream recorded by the second audio input device;

receiving the first and second audio streams during the meeting;

receiving one or more additional user voice inputs annotating at least a first audio fragment and a second audio fragment;

in response to the one or more additional user voice inputs, automatically:
identifying from the first audio stream the first audio fragment;
identifying from the second audio stream the second audio fragment; and
compiling audio fragments from the first audio stream and the second audio stream into an audio file that includes at least the first audio fragment and the second audio fragment; and providing the audio file to one or more recipients, wherein the audio file identifies the first audio fragment as corresponding to a first participant and the second audio fragment as corresponding to a second participant.

2. The method of claim 1, further comprising:
determining that the first and second audio input devices correspond respectively to a first participant identifier and a second participant identifier, the second participant identifier being distinct from the first participant identifier;
associating the first audio fragment to the first participant identifier; and
associating the second audio fragment to the second participant identifier.

3. The method of claim 1, wherein providing the audio file to one or more recipients includes replaying the audio file to the one or more recipients.

4. The method of claim 1, further comprising:
generating a storyboard that includes at least the first audio fragment;
receiving one or more user inputs to edit the storyboard; and
in response to the one or more user inputs to edit the storyboard, performing an action including one or more of:
emphasizing audio fragments belonging to the first participant;
deemphasizing audio fragments belonging to the first participant;
grouping a plurality of audio fragments in the audio file by topic;
grouping audio fragments corresponding to the first participant and the second participant in the audio file; and
adding new audio fragments to the storyboard.

5. The method of claim 4, wherein the storyboard is an audio file.

6. The method of claim 1, further comprising:
generating a storyboard that includes a subset, less than all, of audio fragments in the audio file.

7. The method of claim 1, further comprising:
maintaining the first audio fragment in a first audio channel associated with the first participant; and
maintaining the second audio fragment in a second audio channel associated with the second participant, the first and second audio channels being separate from each other.

8. The method of claim 1, further comprising:
adding a pre-recorded introduction to the audio file.

9. The method of claim 1, wherein a visual signal is provided on the first or second audio input device.

10. The method of claim 9, wherein the first or second participant responds to the visual signal provided on the first or second audio input device, respectively, to confirm whether the first or second participant is currently speaking.

11. The method of claim 1, wherein the audio file has a single audio channel.

12. The method of claim 1, further comprising:
incorporating the one or more additional user voice inputs in the audio file based on locations of the first and second audio fragments in the audio file.

13. A non-transitory computer-readable medium storing one or more programs configured for execution by a system, the one or more programs including instructions for:
establishing a first connection with a first audio input device of a plurality of audio input devices, the first connection configured to enable the system to receive a first audio stream recorded by the first audio input device;
establishing a second connection with a second audio input device of the plurality of audio input devices, the second connection configured to enable the system to receive a second audio stream recorded by the second audio input device;
receiving the first and second audio streams;
identifying from the first audio stream a first audio fragment;
identifying from the second audio stream a second audio fragment;
compiling audio fragments from the first audio stream and the second audio stream into an audio file that includes at least the first audio fragment and the second audio fragment;
generating a storyboard that includes at least the first audio fragment;
receiving one or more user inputs to edit the storyboard;
in response to the one or more user inputs to edit the storyboard, performing an action including one or more of:
emphasizing audio fragments belonging to the first participant;
deemphasizing audio fragments belonging to the first participant;
grouping a plurality of audio fragments in the audio file by topic;
grouping audio fragments corresponding to the first participant and the second participant in the audio file; and
adding new audio fragments to the storyboard; and
providing the audio file to one or more recipients, wherein the audio file identifies the first audio fragment as corresponding to a first participant and the second audio fragment as corresponding to a second participant.

14. The non-transitory computer-readable medium of claim 13, the one or more programs further including instructions for:
determining that the first and second audio input devices correspond respectively to a first participant identifier and a second participant identifier, the second participant identifier being distinct from the first participant identifier;
associating the first audio fragment to the first participant identifier; and associating the second audio fragment to the second participant identifier.

15. The non-transitory computer-readable medium of claim 13, wherein providing the audio file to one or more recipients includes replaying the audio file to the one or more recipients.

16. The non-transitory computer-readable medium of claim 13, wherein the storyboard is an audio file.

17. The non-transitory computer-readable medium of claim 13, the one or more programs further including instructions for:

generating a storyboard that includes a subset, less than all, of audio fragments in the audio file.

18. The non-transitory computer-readable medium of claim 13, the one or more programs further including instructions for:

maintaining the first audio fragment in a first audio channel associated with the first participant; and maintaining the second audio fragment in a second audio channel associated with the second participant, the first and second audio channels being separate from each other.

19. The non-transitory computer-readable medium of claim 13, the one or more programs further including instructions for:

adding a pre-recorded introduction to the audio file.

20. The non-transitory computer-readable medium of claim 13, wherein the audio file has a single audio channel.

* * * * *